United States Patent [19]

Verner et al.

[11] 4,060,574
[45] Nov. 29, 1977

[54] DEVICE FOR LAKE RESTORATION BY OXYGEN-ENRICHING OF THE WATER

[75] Inventors: Bo Lennart Verner, Stockholm; Lars Börje Staffan Fors, Ingaro, both of Sweden

[73] Assignee: Atlas Copco Aktiebolag, Nacka, Sweden

[21] Appl. No.: 551,930

[22] Filed: Feb. 21, 1975

Related U.S. Application Data

[63] Continuation of Ser. No. 258,546, June 1, 1972, abandoned.

[30] Foreign Application Priority Data

June 1, 1971 Sweden .............................. 7002/71
Jan. 28, 1972 Sweden .............................. 972/72

[51] Int. Cl.² .............................................. B01F 3/04
[52] U.S. Cl. .................................. 261/77; 210/221 P; 210/242 A; 261/120; 261/123; 261/124
[58] Field of Search .................... 261/29, 77, 91, 93, 261/121 R, 120, 122-124, 126, DIG. 75; 210/220, 221 R, 221 P, 242 R, 242 A

[56] References Cited

U.S. PATENT DOCUMENTS

| | | | |
|---|---|---|---|
| 1,619,430 | 3/1927 | Mauran | 261/77 |
| 2,353,195 | 7/1944 | Sims | 261/77 |
| 2,825,541 | 3/1958 | Moll et al. | 261/124 X |
| 3,183,065 | 5/1965 | De Bolt | 261/124 X |
| 3,193,260 | 7/1965 | Lamb | 261/124 X |
| 3,503,593 | 3/1970 | Nelson | 261/91 X |
| 3,547,811 | 12/1970 | McWhirter | 261/93 X |
| 3,642,257 | 2/1972 | Tanaka et al. | 261/93 |
| 3,671,022 | 6/1972 | Laird et al. | 261/124 X |
| 3,794,303 | 2/1974 | Hirshon | 261/DIG. 75 |
| 3,799,511 | 3/1974 | Svantesson | 261/123 X |

FOREIGN PATENT DOCUMENTS

95,365 4/1921 Switzerland ................. 261/DIG. 75

Primary Examiner—Frank W. Lutter
Assistant Examiner—Richard L. Chiesa
Attorney, Agent, or Firm—Flynn & Frishauf

[57] ABSTRACT

A method and a device for restoration of lakes by oxygenation of the water. A lake having a depth exceeding 8–10 meters is oxygenated by air-treatment of the lower and colder hypolimnion layer only. Air is introduced into the hypolimnion and is prevented from rising and thereby reaching the upper, warmer epilimnion layer by an air-entrapping bell-shaped housing which is located above the air introduction zone. The device comprises a vertical tube, the upper end of which terminates within said housing and the lower end of which is equipped with an air nozzle. The tube acts as an air-lift pump by which the water is circulated through the housing. The housing is provided with an air outlet at its uppermost part and water outlets at its lowermost part. Ducts for distributing oxygenated water over the lake are connected to the water outlets.

3 Claims, 4 Drawing Figures

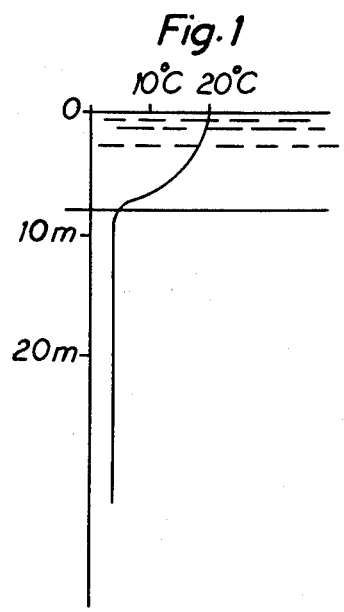
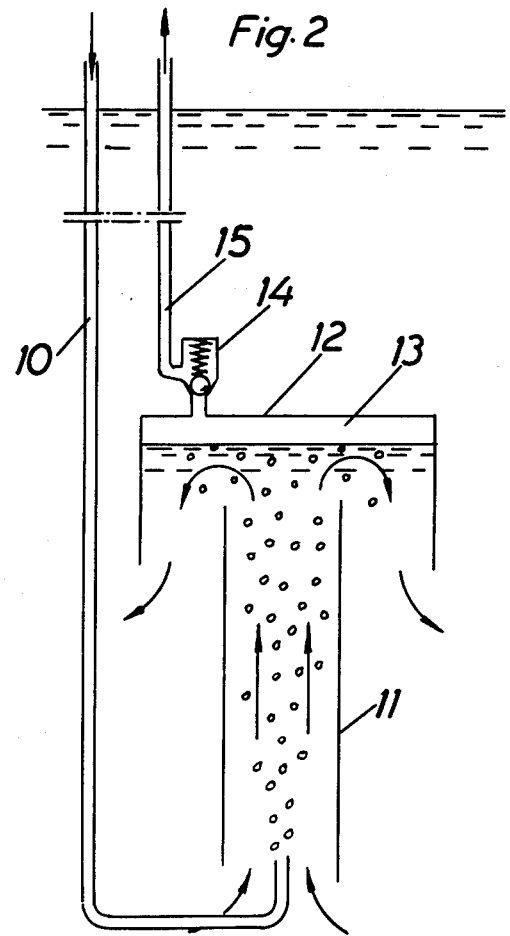

DEVICE FOR LAKE RESTORATION BY OXYGEN-ENRICHING OF THE WATER

This is a continuation, of application Ser. No. 258,546 filed June 1, 1972, now abandoned.

BACKGROUND OF THE INVENTION

This invention relates to a method and a device for restoration of lakes by oxygenation of the water. More particularly the invention intends to solve the problem of air-treatment of lakes the depth of which exceeds 8 to 10 meters without disturbing of the thermal stratification of the water.

During the summer, the water of such lakes is stratified into two different layers, one upper warmer layer, epilimnion, and one lower colder layer, hypolimnion. The border between the epilimnion and the hypolimnion layer is normally situated at a depth of 8 to 10 meters. In very large lakes the hypolimnion may be located at a depth ranging between 30 and 50 meters. The surface layer, epilimnion, has intimate contact with the atmosphere and is therefore able to take up some oxygen. In this upper layer, plankton algae produce organic matter with oxygen as a by-product. When nutrient concentrations in the upper layer are high by nature, or by action of man, a rapid production of organic matter takes place. A large proportion of this matter settles into the lower colder layer where it is broken down by bacteria into its inorganic components. However, these processes will only occur if there is oxygen in the hypolimnion water.

If there is insufficient oxygen for this organic breakdown, nutrient salts will diffuse into the water from the sediment layer at the bottom of the lake during the stagnant summer period. In the course of the following spring circulation, these nutrient salts are distributed throughout the bulk of water and thus become available for further organic production. This continuous increase in production of organic matter makes the oxygen balance progressively worse and the lake cannot avoid this development without outside help.

One way to help the lake out of this situation is to supply oxygen to the water. The oxygen must be supplied to the lower, oxygen-consuming and oxygen-deficient layer, hypolimnion. In this connection it becomes important not to mix the hypolimnion water with the oxygen-rich surface water because a total oxygen deficiency in the lake could be the result.

According to one previously proposed method for oxygenation of lake hypolimnion, water is transported to the surface by means of an air-lift pump and, after having been in contact with the atmosphere, it is returned to its original depth.

This known method has the disadvantage that it requires very bulky equipment which is difficult to handle. The air-lift pump has to be at least 10 meters high to penetrate the epilimnion layer.

Another disadvantage inherent in this method is that the water is brought into contact with air under atmospheric pressure with consequent relatively low oxygen solubility.

According to this invention these problems are solved by air-treatment of the water within the hypolimnion itself, which means that oxygen is introduced into the water at the pressure existing in the hypolimnion. If, for instance, the water is oxygenated at a depth of twenty meters, the amount of oxygen soluble in water is about three times higher than the corresponding amount at the surface. It also means that the device required is much smaller than the previously described air-lift pump. A device for air-treatment of water within the hypolimnion is included in the invention.

BRIEF DESCRIPTION OF THE DRAWINGS

FIG. 1 is a diagrammatic view illustrating the thermal stratification of the water in a deep lake during summer. The upper layer, epilimnion, has a temperature differential from about 20° C at the surface to about 4° to 6° at a depth of about 10 meters, whereas the lower layer, hypolimnion, has a constant temperature from the ten meter level downwards.

FIG. 2 is a schematic view illustrating the water restoration method according to the invention.

Figure 3:
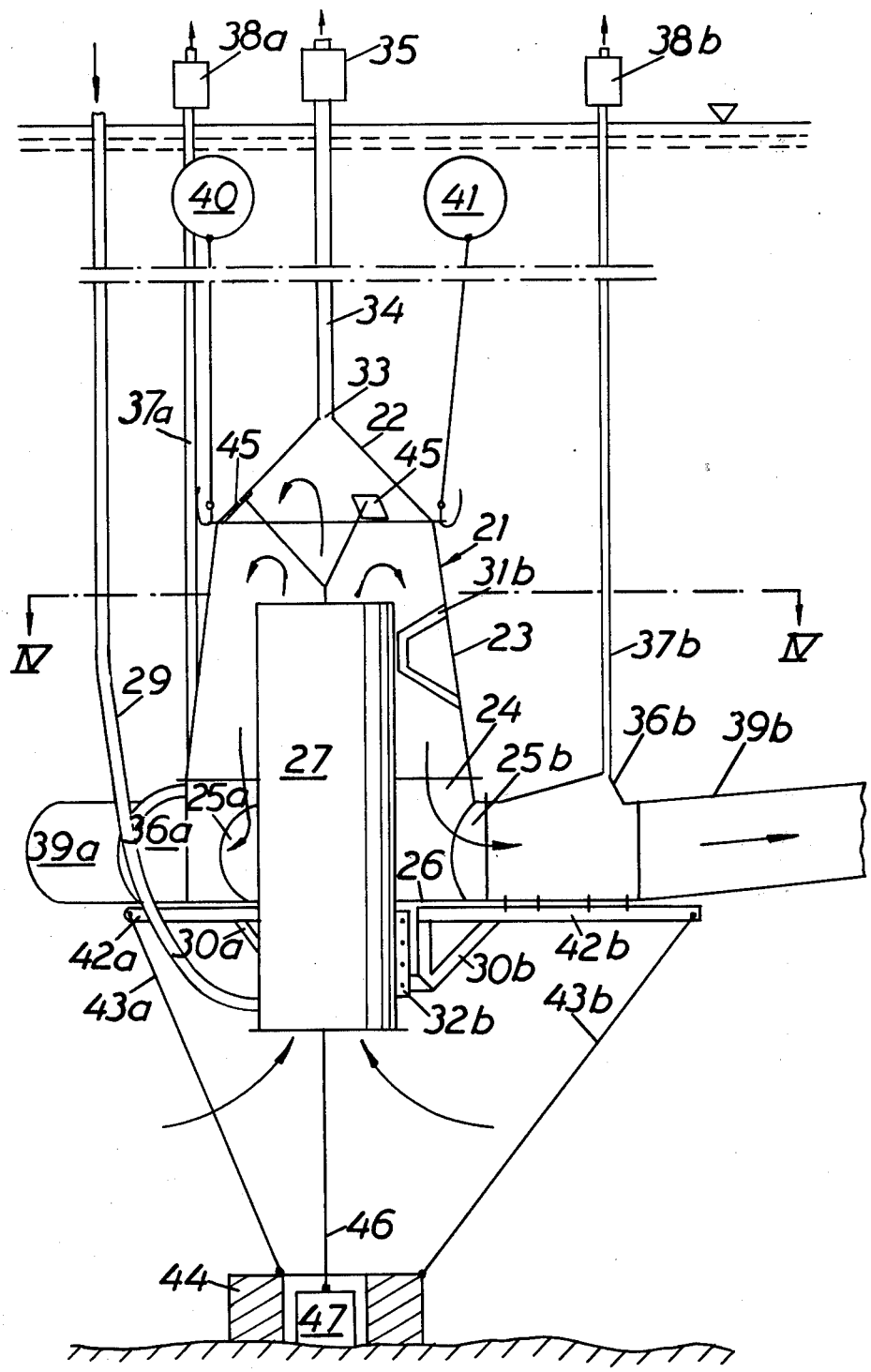
FIG. 3 shows a vertical section of a device according to the invention.
Figure 4:
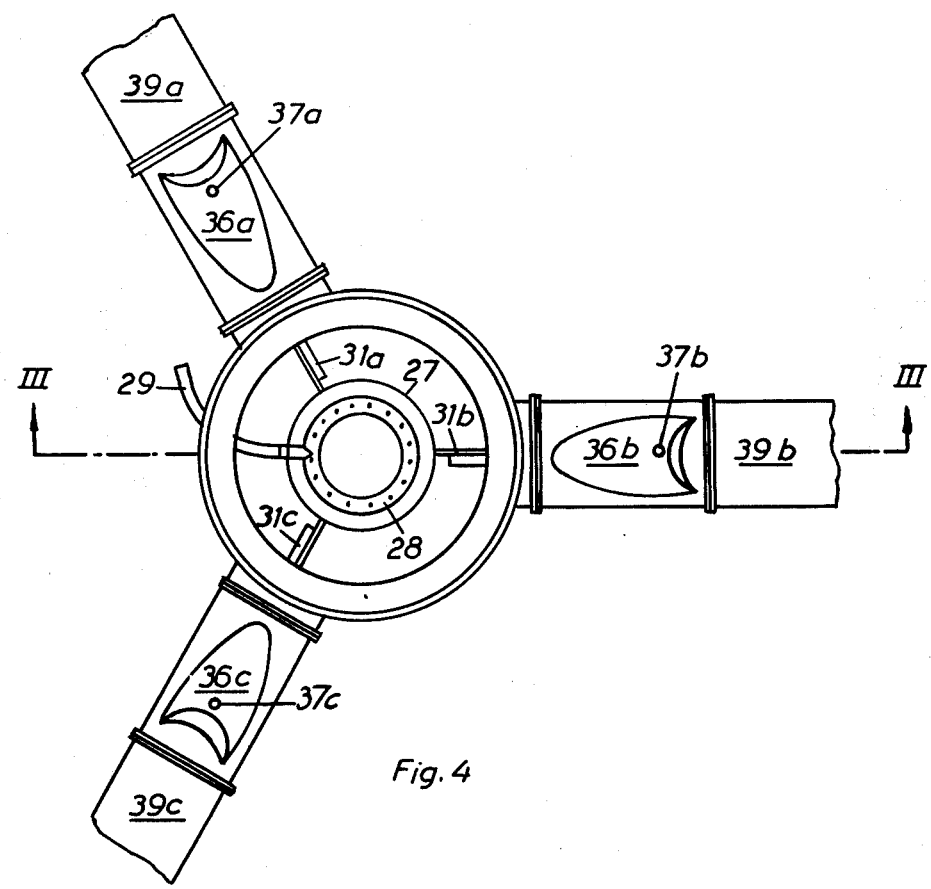
FIG. 4 shows a horizontal section taken along line IV—IV to FIG. 3.

The vertical section shown in FIG. 3 is taken along line III—III in FIG. 4.

DESCRIPTION OF A PREFERRED EMBODIMENT

According to the method illustrated in FIG. 2, air is introduced in the hypolimnion through a conduit 10. This conduit terminates at the lower end of a vertically arranged tube 11 which is open at both ends. As air is blown into the water through conduit 10, bubbles rise up through the tube 11 establishing an air-lift pump. The upper end of the tube 11 is located in a substantially bell-shaped housing 12 the purpose of which is to collect the rising air bubbles. Thus, at the uppermost part of the housing 12, an air cushion 13 is formed, the size of which is controlled by a pressure-sensitive restricting valve 14. Excess air is evacuated to the atmosphere through the valve 14 and a conduit 15. The water is oxygenated by contact with the rising air bubbles in the tube 11 as well as within the air cushion 13 in the housing.

According to the new method, the water enters the tube 11, rises with the air bubbles through the tube 11, passes through the air cushion 13 and leaves the housing. It is important to prevent air bubbles from escaping the housing together with the leaving water because the freely-rising air bubbles would cause an undesirable upward flow of water outside of the apparatus which in turn would disturb the thermal stratification of the water.

Referring to FIGS. 3 and 4, a device for oxygenating water according to the invention will hereinafter be described. The device comprises a housing 21 consisting of an upper part 22, an intermediate part 23 and a lower part 24. The housing 21 has a circular cross section and the upper part 22 and the intermediate part 23 are conical and frusto-conical respectively. The lower part 24 is cylindrical and provided with a plurality preferably three radially arranged outlet openings 25a–c. The lower part 24 is provided with a bottom 26 having a central, circular opening. Moreover, the device comprises a tube 27 which is arranged vertically with its upper end inside the housing 21 level with the intermediate part 23 of the housing and extends downwards through the circular opening.

At the lower end of the tube 27 there is mounted an annular nozzle 28 (see FIG. 4) which is connected to a source of pressurized air (not shown) via a hose 29.

The tube 27 is attached to three symmetrically disposed brackets 30a–c on the lower part 24 of the housing and is radially supported by three symmetrically disposed guide frames 31a–c mounted on the inside of the housing 21. The attachment of the tube 27 makes it possible to displace the tube 27 axially relative to the housing. For that purpose the tube 27 is provided with axially directed mounting wings 32a–c which are provided with a number of holes for fixing of the tube 27 in different axial positions by means of screw joints. This arrangement makes it possible to vary the annular clearance between the upper edge of the tube and the conical inner wall of the housing 21, whereby the velocity of the downwardly directed outlet flow of water can be varied in accordance with the amount of supplied air. This velocity must be kept below the speed of the rising air bubbles in order to prevent air bubbles from being drawn down with the stream.

The upper part 22 of the housing 21 is formed as an air collecting bell provided with an air outlet 33 which communicates with the atmosphere through a conduit 34 and an adjustable flow control valve 35.

To the outlet openings 25a–c in the lower part 24 of the housing are connected distributing ducts 39a–c which are provided with air collecting chambers 36a–c each consisting of a tube section having the same diameter as the outlet openings 25a–c and being provided with bell-shaped bulges. The air collecting chambers 36a–c communicate with the atmosphere through conduits 37a–c which are provided with flow control valves 38a–c. The distributing ducts 39a–c may consist of thin-walled plastic tubes which are advantageous by reason of being cheap, light and easy to handle.

The device according to the invention also includes stabilizing means consisting of floats 40 and 41 connected to the upper part 22 of the housing 21 and of radially extending arms 42a–c on the housing 21. These arms 42a–c are connected to an anchor block 44 at the bottom of the lake by means of wires 43a–c or the like.

The device shown in the FIGS. 3 and 4 also includes a safety device comprising valve scuttles 45 disposed in the upper part 22 of the housing 21. By means of a wire 46, these valve scuttles 45 are connected to a dead-weight 47 resting on the bottom of the lake.

The oxygenation device according to the invention is operated from a platform carried by a floating vessel (not shown) on which the compressed air source is located. On the floating platform there is also arranged a hoist by means of which the entire device can be lifted up or lowered down at the installation. The operator's platform does not comprise part of the invention and for that reason it is not shown in the drawings.

The above described device operates as follows:

In order to oxygenate water by air-treatment, the device according to the invention is lowered into the hypolimnion which is situated at a depth exceeding 8 to 10 meters. The desired depth is obtained by lowering the device until the anchor block 44 and the dead weight 47 rest upon the lake bottom. The floats 40 and 41 are so dimensioned as to carry the main part of the weight of the device besides the anchor block 44 and the dead weight 47. That means that the floats 40, 41 keep the device in an upright position. The lengths of the wires 43a–c and 46 that connect the device to the anchor block 44 and the dead weight 47 are adapted so as to keep the lower edge of the tube 27 at a distance from the lake bottom of about 2 to 3 meters. In deep lakes it may be advantageous to increase the distance substantially.

The device starts working as oxygen-containing gas is supplied to the nozzle 28 from the compressed air source via the conduit 29. The air leaves the nozzle as bubbles which rise through the tube 27 and brings the surrounding water with it. This air-lift pump transports the water up through the tube 27 and into the housing 21.

As the air bubbles leave the vertical tube 27 they go on rising and are finally collected and united into an air volume in the upper-most part of the housing 21. Owing to the pressure of the air volume in the upper part 22 of the housing 21 the water has to change direction of flow and go downwards through the annular space between the housing and the vertical tube 27 and further on out through the outlet openings 25a–c. Then, the oxygen-enriched water passes through the air collecting chambers 36a–c in which air bubbles which might have been drawn down with the stream are allowed to rise and to be collected in the bell-shaped bulges. Then, the treated water is distributed through the ducts 39a–c over the lake.

The remaining gas which is collected in the upper part 22 of the housing 21 is successively conducted to the atmosphere through the air outlet 33, the conduit 34 and the valve 35. In order to avoid the air outlet conduit acting as an air-lift pump, the air flow has to be restricted. That is accomplished by the flow control valve 35. This valve 35 is adjusted so as to make the air volume in the housing as small as possible and to keep it constant in size. This flow control is important, because if the back-pressure in the conduit 34 were too low, water would enter the conduit 34 and a second air-lift pump would be established. On the other hand, if the back-pressure were too high, the air volume inside the housing would grow and finally reach the point where the water circulation in the housing would stop and, may be, the entire device would rise to the surface.

To avoid rising of the entire device the valve scuttles 45 in the upper part 22 of the housing 21 will be opened immediately as the entire weight of dead-weight 47 is acting upon the wire 46. As the safety scuttles 45 are opened, a large volume of air rapidly escapes from the housing 21, whereby the air volume inside the housing as well as the lifting force acting on the device rapidly decreases.

In the air collecting chambers 36a–c a secondary collection of air bubbles takes place. This arrangement insures an efficient separation of air bubbles from the water since those air bubbles which have not been collected in the housing 21 are collected later in the air collecting chambers 36a–c. Thus, the circulation rate in the housing 21 can be relatively high without risking air bubbles escaping into the hypolimnion. The collected air is evacuated from the collecting chambers 36a–c through restricting valves 38a–c in the same manner as air is evacuated from the housing 21.

In the described embodiment of the invention the water levels within the housing 21 and the air collecting chambers 36a–c are controlled by restricting valves which are designed to be adjusted manually so as to produce desirable air volumes. These valves may of course be made to function automatically, for instance by using floats as sensing means for regulating the air flow in accordance with the water levels.

According to another embodiment of the invention the device has no air collecting chambers in the outlet ducts but is provided with a wider space between the tube 27 and the housing which makes it possible to increase the circulation rate without increasing the velocity of the water flow through the housing. Furthermore, it even makes it possible to decrease the water flow velocity and simultaneously increase the circulation rate. By decreasing the water flow velocity in the housing, substantially all of the air may be collected in the housing, thus making a secondary air collection unnecessary.

The size of the air volume within the housing may be controlled by a means which is sensitive to the weight of the device in the water. In other words, if the air volume within the housing is too large, the lift force acting on the device balances the weight of the device. In such a case the control valve has to increase the air flow in the outlet conduit so as to diminish the air volume within the housing.

The invention is not limited to the shown embodiments but can be freely varied within the scope of the claims.

We claim:

1. Apparatus for oxygenating a thermally stratified body of water having an upper warmer and relatively oxygen-rich epilimnion and a lower colder and relatively oxygen-poor hypolimnion without destratification thereof, which apparatus comprises:
   a. an upwardly extending open ended shell located in the hypolimnion;
   b. means for introducing pressurized oxygen-containing gas into the lower end of said shell to propel by gas lift pump action a column of water upwardly within said shell whereby to increase the oxygen concentration of said column of water;
   c. entrapment means located in the hypolimnion above said shell for entrapping a volume of undissolved gas;
   d. passage means for passing the oxygen-enriched water downwardly from over the top of said shell;
   e. controlled means for venting entrapped undissolved gas from said entrapment means to the atmosphere to maintain said volume of undissolved gas under a predetermined pressure effective to cause the oxygen-enriched water to flow downwardly in said passage means;
   f. outlet means for receiving the downwardly flowing oxygen-enriched water and introducing it into the hypolimnion; and
   g. secondary bulged venting means connected to said outlet means for removing residual undissolved gas to the atmosphere.

2. An apparatus for oxygenating a thermally stratified body of water having an upper warmer and relatively oxygen-rich epilimnion and a lower colder and relatively oxygen-poor hypolimnion without destratification thereof; which apparatus comprises:
   a. an inner open-ended shell and an outer shell surrounding said inner shell both located in the hypolimnion and defining therebetween a downwardly extending annular passage open at the
   b. the top end of said outer shell being closed and located at a spaced distance from the top of said inner shell to form a chamber;
   c. means for introducing a compressed oxygen-containing gas into the bottom of said inner shell effective to propel hypolimnetic water upwardly therein under simultaneous oxygenation thereof;
   d. controlled means for venting undissolved gas from said chamber to the atmosphere to maintain a predetermined pressure therein sufficient to cause the oxygen-enriched water to flow downwardly in said annular passage.
   e. outlet means connected to said annular passage for passing the oxygen-enriched water into the hypolimnion; and
   f. secondary bulged means connected to said outlet means for removing residual undissolved gas to the atmosphere.

3. Apparatus for enriching the oxygen concentration in a subsurface stratum of a thermally stratified body of water having an upper warmer and relatively oxygen-rich epilimnion, an intermediate thermocline and a lower colder relatively oxygen-poor hypolimnion, while maintaining undisturbed the thermal stratification thereof, which apparatus comprises:
   a. a dome;
   b. an upright open ended tube having a length substantially exceeding the width thereof, extending into said dome from below, the top of said tube being spaced from the lower end of said dome;
   c. nozzle means at the lower end of said tube;
   d. outlet means at the lower end of the dome spaced downwardly from the top of said tube and upwardly from the lower end thereof;
   e. means for maintaining said dome and tube within the hypolimnion of said body of water;
   f. means for bubbling pressurized oxygen-containing gas through said nozzle means to produce a gas lift pump action within said tube effective to maintain thereabove a gas cushion in said dome to continuously lift water from below into said gas cushion to oxygenate the water during lifting thereof as well as within said cushion and to cause the thus lifted water to sink down in said dome and thence out through said outlet means;
   g. a conduit connecting said dome to the atmosphere;
   h. venting means associated with said conduit to vent excess gas from said gas cushion in said dome to maintain said gas cushion at a predetermined pressure and volume therein; and
   i. the lower end of said dome comprising a bottom portion and said outlet means comprising transverse ducts conected to said bottom portion, each of said ducts having an overlying gas collection chamber associated therewith and conduit means for venting said gas collecting chambers effective to eliminate residual bubbles from the water passing through said ducts and into the hypolimnion.

* * * * *

UNITED STATES PATENT AND TRADEMARK OFFICE
CERTIFICATE OF CORRECTION

PATENT NO. : 4,060,574
DATED : November 29, 1977
INVENTOR(S) : Bo Lennart VERNER et al It is certified that error appears in the above-identified patent and that said Letters Patent are hereby corrected as shown below:

Column 5, last line, after "open at the" insert --bottom--.

Signed and Sealed this

Fourteenth Day of March 1978

[SEAL]

Attest:

RUTH C. MASON
Attesting Officer

LUTRELLE F. PARKER
Acting Commissioner of Patents and Trademarks